US005128176A

United States Patent [19]

Schmidt

[11] Patent Number: 5,128,176
[45] Date of Patent: Jul. 7, 1992

[54] MASKING TAPE

[76] Inventor: Dan R. Schmidt, 1643 South Alcott, Denver, Colo. 80219

[21] Appl. No.: 655,299

[22] Filed: Feb. 14, 1991

Related U.S. Application Data

[63] Continuation of Ser. No. 570,830, Aug. 21, 1990, abandoned, which is a continuation-in-part of Ser. No. 475,154, Feb. 5, 1990, abandoned.

[51] Int. Cl.⁵ .......... B32B 35/00
[52] U.S. Cl. .......... 427/140; 156/94; 427/142; 427/282; 427/421; 428/40; 428/343
[58] Field of Search .......... 156/94, 212, 280; 427/140, 142, 282; 428/40, 156, 158, 161, 343

[56] References Cited

U.S. PATENT DOCUMENTS

| | | | |
|---|---|---|---|
| 2,054,448 | 9/1936 | Russell | 428/343 X |
| 2,210,233 | 8/1940 | DeLille | 118/505 |
| 2,755,196 | 7/1956 | Scholl | 428/343 X |
| 2,959,152 | 11/1960 | Byers et al. | 118/505 |
| 3,032,433 | 5/1962 | Lewis et al. | 118/505 X |
| 3,271,232 | 9/1966 | Moore | 428/343 X |
| 3,380,435 | 4/1968 | Wagner | 118/505 |
| 3,930,069 | 12/1975 | Stephens | 427/421 X |
| 4,201,799 | 5/1980 | Stephens | 427/421 X |
| 4,341,828 | 7/1982 | Stephens | 428/343 X |
| 4,420,520 | 12/1983 | Jones et al. | 428/40 X |
| 4,430,137 | 2/1984 | Jones | 428/40 X |
| 4,789,579 | 12/1988 | Tutas et al. | 428/40 X |
| 4,996,092 | 2/1991 | Francis et al. | 428/157 |

FOREIGN PATENT DOCUMENTS

| | | | |
|---|---|---|---|
| 0207720 | 1/1987 | European Pat. Off. | 428/40 |
| 0365510 | 4/1990 | European Pat. Off. | . |

*Primary Examiner*—Michael Lusignan
*Attorney, Agent, or Firm*—Brian D. Smith

[57] ABSTRACT

Masking tape is disclosed for covering the gaps between adjacent panels of an automobile body and for isolating a section of a panel to be refinished. The tape includes an elongated flexible core having a cross-sectional shape of substantial thickness. At least a portion of the core's outer surface is adhesive. The core is narrow enough at one end to be inserted into a gap and wide enough in another portion to cover the gap, but not the panel edges. The outer surface of the core is angled or curved in such a way as to form an outwardly opening pocket which creates a vortex during spray painting which, in turn, causes paint to gradually diminish in thickness or feather out in the direction of the pocket's bottom.

3 Claims, 2 Drawing Sheets

FIG. 1
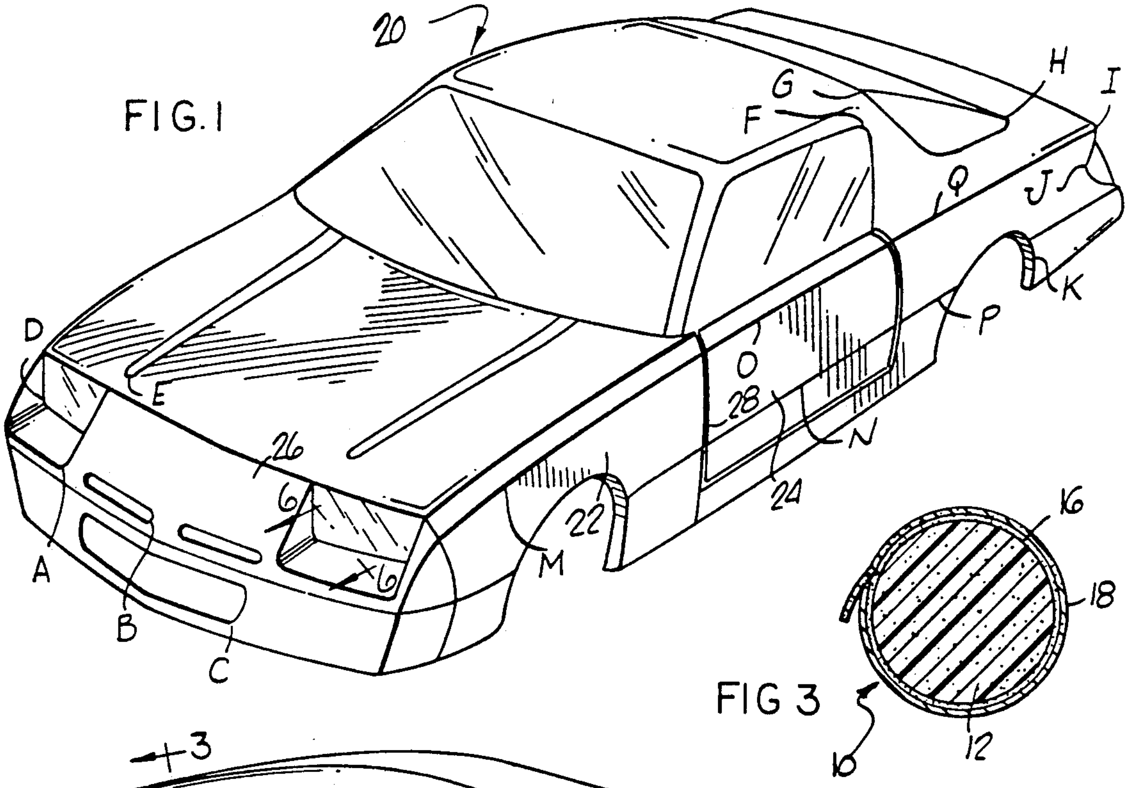
FIG 3
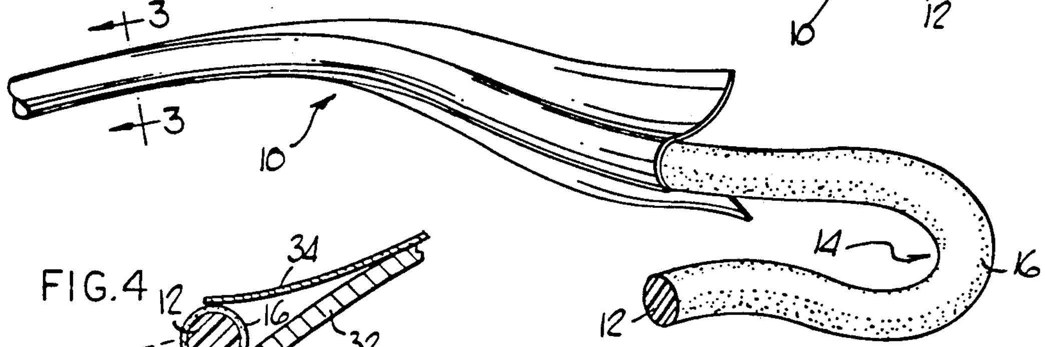
FIG 2
FIG. 4
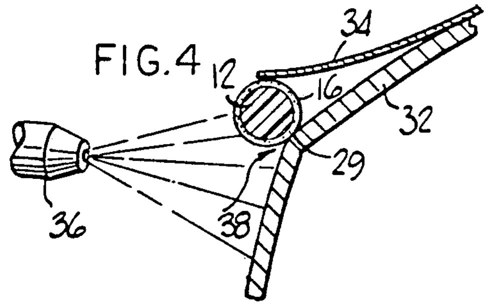
FIG. 6
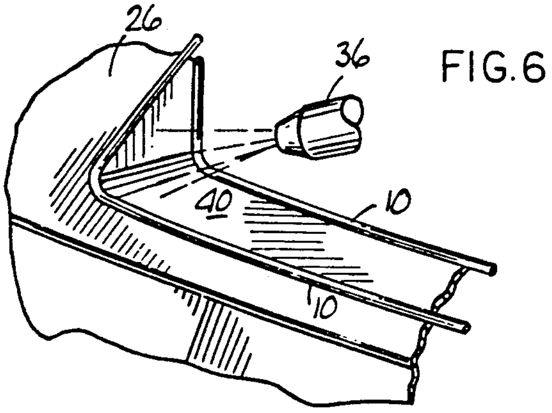
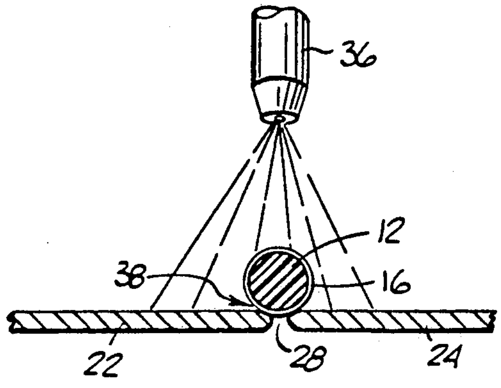
FIG. 5

MASKING TAPE

CROSS-REFERENCE TO RELATED APPLICATION

This application is a continuation of U.S. patent application Ser. No. 570,830, entitled "Automotive Refinish Tape", which was filed on Aug. 21, 1990, now abandoned, which is a continuation-in-part of U.S. patent application Ser. No. 475,154, entitled "Round Automotive Refinish Tape" filed on Feb. 5, 1990, now abandoned.

FIELD OF THE INVENTION

This invention relates generally to tape used for spray painting objects, and more specifically a tape and method for masking automotive body parts which saves time, labor, and materials during the refinishing process.

DESCRIPTION OF THE PRIOR ART

In the field of automotive refinishing, most jobs are contracted at a set price. Therefore, the less time spent on the job, the greater the profit. Consequently, saving time is of great importance.

The most time consuming area of automotive refinishing is in preparation which takes place before the final color refinish materials are applied. Normally, the process begins by spraying several layers of primer over a repaired portion of a panel. For example, consider a repair which has been done where the rear of a fender meets the front of the driver's door. When primer is sprayed over this area, some primer, i.e. overspray, enters the gap between the panels. The overspray can be seen by looking at the hinge area of the door after opening the driver's door. Because the front door edge moves in relation to the fender when the door is opened, it is extremely difficult to tape this gap from the inside. In this situation, technicians typically follow several procedures.

One common procedure is to allow the sprayed material to overspray areas behind the gap, and then to clean the overspray from the hinge area using a solvent This procedure is difficult and time consuming.

An alternative procedure is to overspray the areas behind the gap, and then spray the proper matching color of the automobile over the overspray. In addition to being extremely time consuming, this procedure is unsatisfactory because the hinge area is not usually cleaned or prepared for painting. Thus, the paint tends to flake or peel over time.

A third procedure is to overspray the area behind the gap and leave the area discolored. This "do nothing" procedure is certainly the most time efficient procedure, but it cannot be considered a proper repair.

Yet another alternative is to attempt to adhere tape to the inside edge of the door. This approach is very time consuming since it is difficult to tape around the hinges.

The most professional refinishing procedure involves removing one or more of the automobile panels and then thoroughly cleaning the areas behind the gap before applying tape for proper masking. This procedure is also extremely laborious and time consuming.

Refinishing small damaged areas, even those not encompassing a gap, is also problematic. It is generally desirable to only refinish the area immediately surrounding the small damaged portion, rather than refinish the entire panel using final coat materials.

When painting small areas, it is extremely important that the technician carefully blend, or feather, the paint in the area where the new paint and old paint meet so that no lines of demarcation are visible. One way to accomplish this is to add reducer to the refinish materials in the area where the technician wishes to cease painting.

In addition to adding reducer, it is standard procedure to apply protective tape to a "demarcation zone" or body line dividing the automobile panel into two surface sections. One prior art tape using this method disclosed in U.S. Pat. Nos. 4,341,828 and 3,930,069 to Stephens comprises a flat strip having an adhesive coating on a portion of one of its side surfaces, and at least one non-adhesive edge adjacent to the adhesive coating. The adhesive portion of the tape is secured to the body line, while the non-adhesive portion is folded up toward the area to be refinished. This method ensures that, upon removal of the tape and other covering materials, no tape mark will be visible The prior art tape described above reduces time, labor and material, and is generally very useful when applied to straight or slightly curved body lines. However, when applied to body lines of significant curvature, the functional non-adhesive portion of the tape tends to distort, thus detracting from the overall quality of the paint job.

Accordingly, there is a need for a masking tape which will adhere to adjacent panel edges of an automobile and cover the gap located between the panels. There is also a need for tape which will follow a small-radius curve without distorting so that a pocket of uniform size is formed at the adhesive contact area to which refinish material can be sprayed without leaving a tape edge.

Accordingly, it is an object of this invention to provide a masking tape which can be easily and quickly applied (from the outside) to a gap between body panels to prevent sprayed materials from entering the gap.

Another object of the invention is to provide a masking tape which will relieve automotive technicians of the laborious task of manipulating or removing body panels where it is necessary to prevent sprayed material from entering a gap between panels.

Still another object of the invention is to provide a convenient and easy to use masking tape that will eliminate the desire to leave gaps unmasked.

A further object of the invention is to provide a masking tape that enables refinish materials to be blended or feathered along significantly curved body lines, thereby enabling smaller areas to be refinished which saves labor, time, and materials over prior refinish blending methods.

Yet a further object of my invention is to provide a masking tape for refinishing small areas, the edges of which have relatively tight radii of curvature.

And still a further object of the invention is the provision of an inexpensive, simple, time and labor-saving method of automotive refinishing using an adhesive tape according to the foregoing.

SUMMARY OF THE INVENTION

The present invention addresses the aforementioned desired objects by providing a masking tape and method for spray painting objects, particularly automobiles. The tape is particularly appropriate for spray painting selected sections of automobile body panels, especially portions near curved body lines or gaps.

The tape includes an elongated core having an outer surface and a cross-sectional shape of substantial thickness. The core is flexible along its length so that it is capable of following horizontal and vertical curves. The shape of the core is such that it defines a first portion of the core's outer surface that diverges away from the surface of an object to be painted when a second portion of the core's outer surface is adhered to the object's surface. As such, the first portion of the core's outer surface and the object's surface cooperate to form an outwardly opening pocket. The tape also includes means for adhering at least a second portion of the core's outer surface to the object's surface.

In a preferred embodiment of the present invention, the cross-sectional shape of the core is preferably tapered in the sense that it is narrower at one end than it is in an intermediate portion. The width of the narrow end of the tape should be less than the width of a gap between adjacent parts of an automobile body, and the width of the intermediate portion should be greater than the width of the gap. Thus, the narrow portion of the tape can be inserted into the gap to fill the gap, without covering the panel next to the gap. This allows a technician to spray primer materials right up to the edge of the gap without any primer material getting into the gap.

The method of the present invention is directed to spray painting objects having a first section to be spray painted and a contiguous second section to be masked, at least a portion of the intersection of the first and second sections being along a horizontal curve. The method includes providing a masking tape of the present invention as set forth above and applying at least the second portion of the masking tape along the horizontally curved portion of the the intersection of the first and second sections of the object to be painted so that a pocket opening outwardly is formed along the intersection of the sections over the first section to be painted. The method also includes masking the contiguous second section of the object to prevent it from being spray painted. Finally, the method includes spraying paint on the first section of the object so that the paint encounters a vortex at the pocket which causes the paint to diminish in thickness inwardly terminating at the intersection of the first and second sections In a preferred embodiment of the method of the present invention, the second portion of the masking tape is applied along the ridged body line of an automobile so that the pocket is formed outwardly from the ridge over a section of the automobile to be painted. Those sections of the automobile which are not desired to be painted are masked off with conventional masking means. The flexibility of the tape's core ensures that the pocket's size will remain uniform even when the ridged body lines have small radius curves. As a result, blending or feathering of the paint will be uniform along the edges of all refinished portions of the automobile.

BRIEF DESCRIPTION OF THE DRAWINGS

The foregoing and further and more specific objects and advantages of the invention will become readily apparent to those skilled in the art from the following detailed description of preferred embodiments thereof taken in conjunction with the drawings in which:

FIG. 1 is a perspective view of an automobile showing general and specific areas to which my apparatus and refinish blending technique apply;

FIG. 2 is a perspective view of masking tape according to a first embodiment of the present invention;

FIG. 3 is a cross-sectional view taken along lines 3—3 of FIG. 2;

FIG. 4 is a cross-sectional view of the tape of FIG. 2 as applied to a body line of FIG. 1 during the refinish blending process;

FIG. 5 is a cross-sectional view of the tape of FIG. 2 as applied to a gap between panels of FIG. 1 during the refinish preparation process;

FIG. 6 is a sectional view of the automobile of FIG. 1 taken along lines 6—6;

DETAILED DESCRIPTION OF THE PREFERRED EMBODIMENTS

Figure 7:
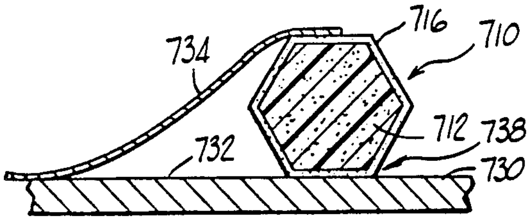
FIG. 7 is a cross-sectional view of masking tape according to a second embodiment of the invention, applied to a body panel of FIG. 1.

Turning now to the drawings in which like reference characters indicate corresponding elements throughout the several views, attention is first directed to FIG. 2, which shows the masking or adhesive tape according to a first embodiment of the invention, indicated in its entirety by the numeral 10.

Tape 10 comprises an elongated core 12 having a circular cross-sectional shape. The diameter of core 12 is uniform throughout its length. Core 12 is formed of material which is sufficiently flexible along its length to allow tape 10 to be bent and folded along small radius curves, without significant distortion. As such, tape 10 is capable of following both horizontal and vertical curves. A horizontal curve is perhaps best described as a curve which can be made by drawing a curved line on a flat surface. A vertical curve as described herein is a line which can be drawn on a curved surface which appears to be straight as viewed from a position above the curved surface, but which is in fact curved since it is drawn on a curved surface. Tape 10 of the present invention is capable of following both horizontal and vertical curves and in fact can be applied to a surface making both horizontal and vertical curves simultaneously, i.e. tape 10 can make a horizontal curve on a curved surface. The flexibility of core 12 is visually represented in area 14, which shows that core 12 can be doubled into a U-shaped configuration without breaking. In addition, core 12 should be of sufficient tensile strength to withstand manual tugging. Any material which meets the above criteria and which can be obtained at a low cost is suitable for use in the core. One material that has been found to be functional is polystyrene styrate. Other inexpensive foams and lightweight materials are also acceptable.

The entire circumference of the core 12 is preferably coated with pressure sensitive adhesive material 16, similar in composition to the adhesive found on conventional masking tapes. A protective covering 18 surrounds adhesive 16 to prevent tape 10 from sticking to itself when stored in coiled configuration. Covering 18 may be formed of waxed paper, or any common, thin inexpensive material which adheres only slightly to the pressure sensitive tape, allowing ease of removal.

While it is generally preferred to coat (or embed) the entire circumference of core 12 with an adhesive material, there may be applications where it is desirable to coat only a portion of the core's circumference with adhesive; for example, perhaps only ⅓ of the core's circumference. Coating only a portion of the core may reduce costs and eliminate the need for a protective covering, such as covering 18. It may also be possible to eliminate the covering by forming or making the core out of an adhesive material.

A method of refinishing an automobile using tape 10 will now be described, with reference to the conventional vehicle 20 illustrated in FIG. 1. The body of the vehicle 20 comprises a number of contiguous panels, including left front fender 22, door 24, and header 26. Fender 22 and door 24 are separated by a gap 28. In addition, the body includes a number of ridged body lines or creases which divide the panels into adjacent surface sections. Some of the body lines are significantly curved at some interval along their length, as indicated by line A-L. Other lines are relatively straight, as indicated by line M-Q.

FIG. 4 represents a cross-sectional view of any of the ridged body lines A-Q of FIG. 1. The body line represents the intersection or ridge 29 between two angularly disposed subsections 30, 32 of body panel. Subsection 30 represents an area to be repaired or refinished, while subsection 32 is to be left "as is". To refinish subsection 30, a technician applies a strip of adhesive tape 10 of appropriate length to ridge 29, thus forming a boundary or barrier between subsections 30 and 32. A sheet of conventional masking paper 34 is placed over subsection 32 and affixed to the adhesive surface 16 of tape 10. Next, the technician applies a full bodied coating of paint to subsection 32, using a standard pressurized paint spray applicator 36, thus restoring subsection 32 to its full, original color. Light coats of thinner are then applied outwardly from the refinished area bounded by tape 10. In this way, the paint is feathered to a 0 mill thickness at the outwardly opening pocket of tape 10 in the area of ridge 29 (i.e. where the tape and body surface meet or intersect).

The round configuration of tape 10 creates a pocket 38 between the surfaces of tape 16 and subsection 30 of automobile 20. A vortex is created in pocket 38 as the high pressure air from applicator 36 flows over the area. This vortex prevents paint from building up near the area where tape 10 and subsection 30 meet or intersect. As a result, the thickness of the paint diminishes as it approaches ridge 29. This, in combination with the use of thinners, results in a very smooth transition between subsections 30 and 32. In other words, no paint break line can be seen. This effect is magnified still further by the angularity of the body panel, which naturally highlights the panel color along the body lines.

The flexibility of core 12 ensures that pocket 38 will remain uniform, even when tape 10 is applied to curved body lines which form enclosures of a variety of shapes, as indicated by lines A-L. One such enclosure is shown in FIG. 6. Note that both strands of tape 10 are applied to body lines of significant curvature.

The only area 40 exposed to paint from spray gun 28 is the area between the two strands of tape 10. Outlying areas would be covered in a traditional manner. This allows the enclosed area 40 to be refinished with the full advantages offered by tape 10 of the present invention.

It should also be noted that the angle formed by intersection of subsections 30, 32 may be of any magnitude, as along as the body line or ridge 29 protrudes. In some cases, the refinish method may be used when the angle is inverted.

Another application of tape 10 is shown in FIG. 5. In this case, tape 10 is applied to a gap 28 between adjacent panels 22, 24 of automobile 20, to prevent sprayed material from entering the gap. The rounded surface of tape 10 ensures that the tape will fully cover gap 28, while leaving no tape line which would have to be sanded off, as would be the case with conventional flat masking tape. Tape 10 may be made in a variety of different diameters to cover gaps of various widths. One tape of sufficient width could be used to cover gaps of several different widths, or a single gap of varying width.

It is not strictly necessary that the cross-sectional shape of tape 10 be circular, as in the embodiment of FIGS. 1–6. Any shape which is narrower at one end than at any intermediate portion so that the outer surface of the tape diverges from the surface of the automobile body to which it is applied would be appropriate. For the purposes of this discussion, the width of the cross-sectional shape is defined as the distance from one adhesive side of the tape to the opposite adhesive side, measured along a line which is generally parallel to the surface of the automobile. Thus, the width of circular tape 10 at any point is equal to the length of a chord through that point and parallel to the surface of the automobile. Thus, the maximum width of tape 10 is equal to its diameter, while the minimum width is zero. When used to cover a gap, the width of the narrow end of the tape must be less than the width of the gap, while the width of the intermediate portion must be greater than the width of the gap.

Figure 8:
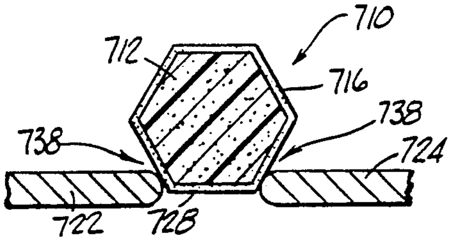
FIG. 8 is a cross-sectional view of the tape of FIG. 7 as applied to a gap between panels of FIG. 1.

Various examples of suitable tape cross-sectional shapes are shown in FIG. 7–18. For instance, FIGS. 7 and 8 show masking tape 710 according to a second embodiment of the invention, wherein the cross-sectional shape of core 712 is hexagonal. Core 712 is preferably surrounded on all of its sides by adhesive coating 716. However, as with tape 10, it may only be necessary to coat a portion of the core with adhesive, perhaps only 2 or 3 sides.

FIG. 7 shows tape 710 being used to divide a body panel into adjacent subsections 730 and 732. A sheet of masking paper 734 is placed over subsection 732, with its terminal edge affixed to adhesive coating 716 of tape 710. Thus, subsection 730 may be refinished without any paint reaching subsection 732. Because the sides of hexagonal core 712 diverge from surface 730, pocket 738 is formed, creating a vortex for blending or feathering the paint.

FIG. 8 shows tape 710 being used to cover gap 728 between body panels 722 and 724. Once again, pockets 738 are formed between the sides of tape 10 and body panels 722 and 724, creating a feathered effect.

Figure 9:
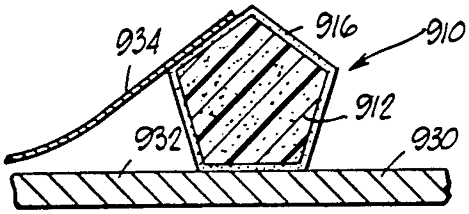
FIG. 9 is a view, similar to FIG. 7, of masking tape according to a third embodiment of the invention.
Figure 10:
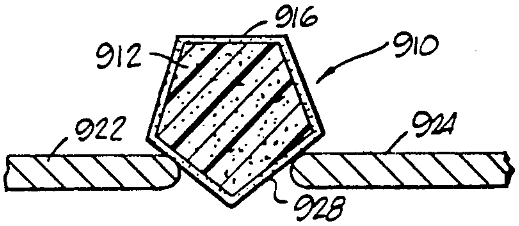
FIG. 10 is a view, similar to FIG. 8, of the masking tape of FIG. 9.

FIGS. 9 and 10 show masking tape 910 according to a third embodiment of the invention, wherein core 912 is pentagonal. Once again, core 912 is preferably coated on all sides by adhesive coating 910. However, it may only be necessary to coat two of the core's sides.

FIG. 9 is a view similar to FIG. 7, showing tape 910 being used to divide an automobile panel into a first portion 930 and a second portion 932, wherein the second portion is covered by masking paper 934. FIG. 10 is a view similar to FIG. 8, showing tape 910 covering a gap between panels 922 and 924.

Figure 11:
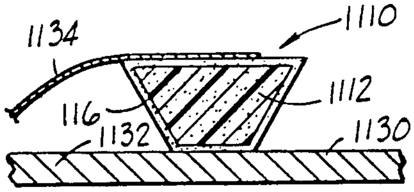
FIG. 11 is a view, similar to FIG. 7, of masking tape according to a fourth embodiment of the invention.
Figure 12:
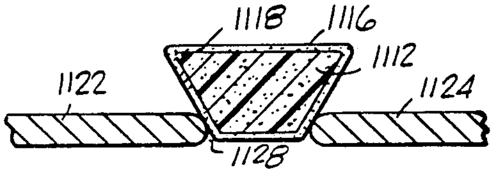
FIG. 12 is a view, similar to FIG. 8, of the masking tape of FIG. 11.

A fourth embodiment of the invention is represented in FIGS. 11 and 12, which shows tape 1110 having a trapezoidal core 1112 and adhesive coating 1116. While all sides of this core are preferably coated with adhesive, it may not be necessary to coat all sides, particularly the widest side identified by numeral 1118. FIG. 11, similar to FIG. 7, shows tape 1110 dividing an automobile panel into first portion 1130 and second portion 1132, wherein second portion 1132 is covered by masking paper 1134. FIG. 12, similar to FIG. 8, shows tape 1110 covering gap 1128 between body panels 1122 and 1124.

Figure 13:
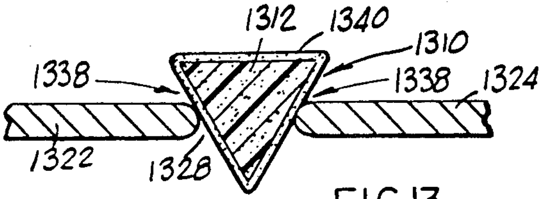
FIG. 13 is a view, similar to FIG. 8, of masking tape according to a fifth embodiment of the invention.

A fifth embodiment of the invention is illustrated in FIG. 13. This embodiment, in which core 1312 of tape 1310 is triangular, is not suitable for applications such as those shown in FIG. 4 or FIGS. 7, 9 and 11, since the sides of the triangular core would converge when the base of the triangle is placed on the surface of the automobile, and thus would not form an outwardly opening pocket for feathering the edges of the paint. However, the triangular configuration of tape 1310 would be suitable for covering gap 1328 between adjacent body panels 1322, 1324, because the sides would diverge from surfaces 1322 and 1324, forming pockets 1338 as required when the apex of the triangle is inserted downwardly in gap 1328 as shown. While core 1312 is illustrated as having a coating (not numbered) of adhesive, adhesive may not be necessary if the core is made out of a sufficiently resilient material which enables the core to adhere to the gap when the tape is lightly pressed into the gap. This type of adhesion is sometimes referred to as an "interference fit".

Figure 14:
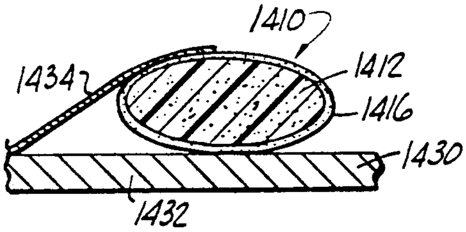
FIG. 14 is a view, similar to FIG. 7, of a sixth embodiment of the invention.
Figure 15:
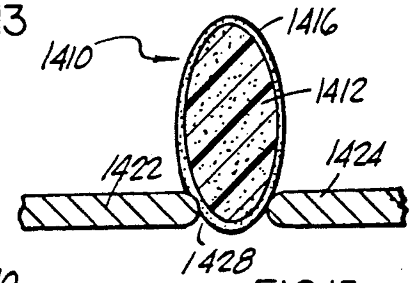
FIG. 15 is a view, similar to FIG. 8, of the masking tape of FIG. 14.
Figure 16:
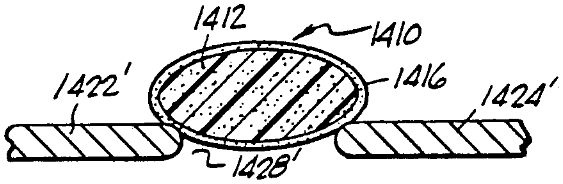
FIG. 16 is a cross-sectional view showing the masking tape of FIG. 15, as applied to a gap of greater width.

A sixth embodiment of the invention, in which tape 1410 comprises an elliptical core 1412 having an adhesive coating 1416, is illustrated in FIGS. 14–16. FIG. 14 is a view similar to FIG. 7, in which tape 1410 is used to divide an automobile body panel into subsections 1430 and 1432, where subsection 1432 is covered by masking paper 1434. FIG. 15, shows tape 1410 being used to cover a relatively narrow gap 1428 between body panels 1422 and 1424. Tape 1410 is oriented such that its major axis is generally perpendicular to the surface of panels 1422 and 1424. FIG. 16 shown tape 1410 rotated 90° relative to its orientation in FIG. 15, so that its minor axis is generally perpendicular to the surface of the automobile. Thus, tape 1410 may be used to cover a wider gap 1428' between panels 1422' and 1424'.

Figure 17:
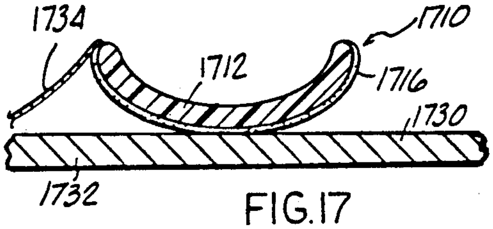
FIG. 17 is a view, similar to FIG. 7, of a seventh embodiment of the invention.
Figure 18:
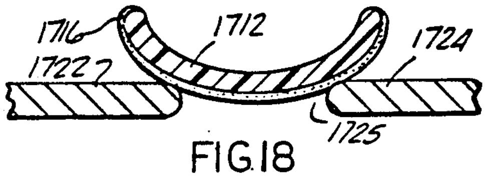
FIG. 18 is a view, similar to FIG. 16, of the masking tape of FIG. 17.

A seventh embodiment of the invention is illustrated in FIGS. 17 and 18. In this embodiment, core 1712 of tape 1710 is bent around its longitudinal axis, resulting in a generally U-shaped cross-sectional shape. The material selected to form core 1712 of this embodiment must have sufficient rigidity in a transverse direction to retain its U-shaped structure. In other words, tape 1710 must not flatten to the shape of conventional masking tape when a small amount of downward pressure is applied to its ends. As in the previous embodiments, tape 1710 may be used to divide a continuous body panel into separate subsections 1730 and 1732, where subsection 1732 is covered by masking paper 1734, as shown in FIG. 17, or it may be used to cover a gap 1728 between panels 1722 and 1724, as shown in FIG. 18. In this embodiment, it is only necessary to cover the convex side of the core 1712 with adhesive 1716.

Various modifications and variations to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described and disclosed the instant invention and alternately preferred embodiments thereof in such clear and concise terms as to enable those skilled in the art to understand and practice the same, the invention claimed is:

1. A method of spray painting objects having a first section to be spray painted and a contiguous second section to be masked, at least a portion of the intersection of the first and second sections being along a horizontal curve, said method comprising:

providing a masking tape including:

an elongated core having an outer surface and a cross-sectional shape of substantial thickness, said core being flexible along its length so that it is capable of following horizontal and vertical curves, the core defining a first portion of the core's outer surface that diverges away from the first section of a object to be painted when the second portion of the core's outer surface is adhered to the object's surface; and means for adhering at least the second portion of the core's outer surface to the object's surface;

masking the contiguous second section to prevent paint from contacting the second section;

applying at least the second portion of the masking tape along the horizontally curved portion of the intersection of the first and second sections of the object to be painted to form a pocket opening outwardly from the intersection of the sections over the first section to be painted; and spraying paint on the first section of the object so that the paint encounters a vortex at the pocket which causes the paint to diminish in thickness inwardly terminating at the intersection of the first and second sections.

2. A method as claimed in claim 1 wherein the object being painted is the body of a motor vehicle having ridged body lines and wherein at least the second portion of the masking tape is applied along the ridged body line so that the pocket opens outwardly from the ridged body line over a section of the automobile's body to be painted.

3. A method as claimed in claim 1 wherein the pocket formed along the horizontally curved portion of the intersection of the first and second sections is substantially uniform.

* * * * *